UNITED STATES PATENT OFFICE.

JOSHUA ELLINGWOOD, OF OWENSBOROUGH, KENTUCKY.

IMPROVED PROCESS OF DISTILLING SPIRITS.

Specification forming part of Letters Patent No. 95,574, dated October 5, 1869.

*To all whom it may concern:*

Be it known that I, JOSHUA ELLINGWOOD, of the town of Owensborough, in the county of Daviess, in the State of Kentucky, have invented certain valuable improvements in the process of distilling alcoholic liquors from grain, grapes, and other substances capable of yielding such liquors by distillation; and I hereby declare that the following is a full, clear, and exact description of my said improved process.

The nature of my invention consists, first, in the use of water-slaked lime in certain proportions, and at certain stages in the fermentation of the wort from grain, grapes, and other substances, in order to more thoroughly extract therefrom their saccharine matters than has been done heretofore by any other process, and by this means increasing the yield of alcohol from a given quantity of grain, grapes, or other substances used; second, in supplying, by the means specified, to such wort during fermentation, and at a certain stage thereof, hydrogen sufficient to unite with and wholly take up the oxygen and carbon evolved during that process, in the form of carbonic-acid gas, and which have heretofore been allowed to escape and waste, and by such union increase the yield of alcohol; third, in the use of a certain proportion of carbonate of potassa in the singlings during their passage from the boiler to the condenser. The great affinity which this substance has for the lighter oils, which are so injurious to whisky, and other liquors, induces it to unite with them and form a heavy compound, which falls to the bottom of the vessel, while the lighter alcoholic product passes off.

To enable others skilled in the art to make and use my improved process, I will proceed to describe the same.

My improvement may be used in either the sweet or sour mash process.

Upon the supposition that the malting, grinding, infusion, and mashing have been done in the usual manner, and that the product (the wort) has been undergoing fermentation, set to work by the usual means, for about twelve hours, I then add to it about five pounds of water-slaked lime for each twenty-eight hundred gallons of the fermenting-wort present in a body.

The lime has the effect of forcing the saccharine matter from the refuse matter present, and of preventing or arresting putrefaction, and at the same time hastens the growth of the yeast, which is the prime agent in the production of alcohol.

There will be but little, if any, waste of carbon and oxygen during fermentation, if that process be confined to what may be termed alcoholic fermentation, and not be allowed to enter upon the next succeeding stage, putrefaction, which produces acetic acid, &c.

The next step in my process is the adding of one ounce of muriate of ammonia to the same quantity of the fermenting-fluid before mentioned, namely, twenty-eight hundred gallons, and this should be done at periods varying from twelve to thirty hours from the commencement of fermentation, so as to be done at the moment carbonic acid is found to be escaping.

The large proportion of hydrogen present in the ammonia so added being set free, unites with the oxygen and carbon evolved, and by reason of the strong affinity of these elements for each other, alcohol is formed, whereas, but for the opportune presence of this supply of hydrogen, the oxygen and carbon might escape as a dead loss.

The chlorine present in the muriate of ammonia tends to increase the growth of the yeast-plant, and, as a consequence, the increase of alcohol.

The supply of hydrogen necessary to unite with and take up the oxygen and carbon, which are evolved in fermentation, as hereinbefore stated, may be furnished by passing a jet of that gas into and through the fermenting-fluid from a retort, wherein it may be produced from zinc, sulphuric acid, and water, or by other means.

Now, chemists heretofore have not only admitted, but asserted, that escape of oxygen and carbon was necessary and unavoidable in the process of alcoholic fermentation, while it is well known that these elements are necessary ingredients in the composition of the resulting alcohol.

One of the principal objects of my invention is, however, to furnish the third ingredient, hydrogen, and by its aid make alcohol of the carbonic acid, instead of allowing that to escape and be entirely lost.

In the first place, by the means set forth, the fermentation is restricted within limits, short of putrefaction, so as to set free as little oxygen and carbon as possible.

Fermentation having been completed and the formation of alcohol has also been completed, but the alcohol remains in the mash, and the next step will be to separate it from the refuse material, and all other impurities.

This is distillation proper, and, if not prevented, some of the lighter oils will pass over into the singlings, and injure the quality and value of the alcoholic liquor.

Now, to prevent this result, I introduce carbonate of potassa into the singlings during their passage from the boiler to the condenser, in the proportions of about one and one-half ounce of the carbonate of potassa to a doubling of two hundred and forty gallons.

The great affinity of the carbonate of potassa for the lighter oils present in the singlings induces it to unite with them and form a heavier compound, which is precipitated to the bottom of the vessel by its own weight, while the spirits pass off at a comparatively low temperature, leaving this compound behind.

By the use of my improvements, I effect a large increase in the yield of alcohol per bushel of Indian corn, for instance, and at the same time a much greater degree of purity in the product than has been done by any other process; and my improvements may be used in the manufacture of brandy and whisky, and all other alcoholic liquors, from whatever grain or other substances used.

What I claim as new, and desire to secure by Letters Patent, is—

1. The introduction and use of water-slaked lime in the wort or beer during fermentation, at the stage of that process, in the proportions, and for the purposes substantially as described and set forth.

2. The introduction and use of muriate of ammonia in the wort or beer during fermentation, at the stage of that process, in the proportions, and for the purposes set forth, and substantially as described.

3. In combination with the use of water-slaked lime and muriate of ammonia, each in the manner and for the purpose described, the introduction of hydrogen, by any suitable mechanical means, in quantity sufficient to unite with and take up any surplus carbon and oxygen evolved, which might otherwise escape during alcoholic fermentation, and thus form alcohol, substantially as described and set forth.

4. The introduction and use of carbonate of potassa in the singlings during the process of distilling alcoholic liquors, at the stage, in the proportions, and for the purpose set forth, substantially as described.

5. The described process of conducting alcoholic fermentation and distillation as a whole, substantially as described and set forth.

JOSHUA ELLINGWOOD.

Witnesses:
WILLIAM WOOD,
DE WILTON FORD.